J. M. DILLON.
Gas Machines for Carbureting Air.
No. 156,142.  Patented Oct. 20, 1874.
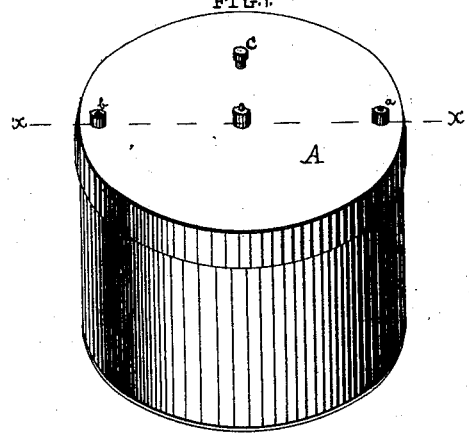
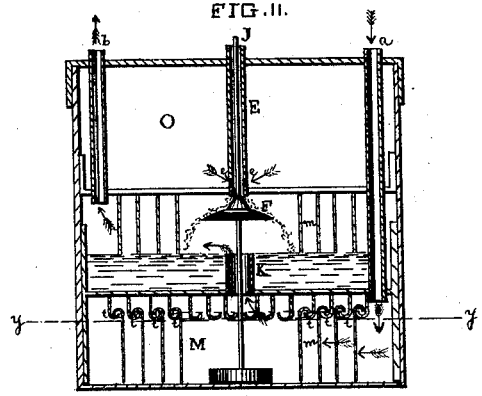
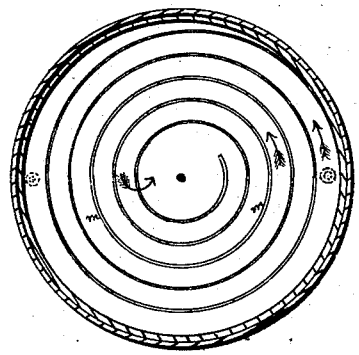
WITNESSES.  
R. K. Evans  
F. B. Townsend
INVENTOR.  
James M. Dillon  
by A. H. Evans & Co  
Atty

UNITED STATES PATENT OFFICE.

JAMES M. DILLON, OF WHEELING, WEST VIRGINIA.

IMPROVEMENT IN GAS-MACHINES FOR CARBURETING AIR.

Specification forming part of Letters Patent No. 156,142, dated October 20, 1874; application filed September 16, 1874.

*To all whom it may concern:*

Be it known that I, JAMES M. DILLON, a citizen of Wheeling, West Virginia, have invented a new and useful Improvement in Gas-Machines, of which the following is a clear, full, and exact description, reference being had to the accompanying drawings making a part of this specification, in which—

Figure 1 represents the machine in perspective. Fig. 2 is a vertical section through the line $x\ x$. Fig. 3 is a horizontal section on the line $y\ y$.

The object of my invention is to supply a cheap and efficient machine for producing illuminating-gas from vaporized gasoline; and it consists in the construction, arrangement, and combination of the parts hereinafter described and explained.

To enable others skilled in the art to make and use my invention, I will proceed to describe the exact manner in which I have carried it out.

In the drawings, A represents a gasometer; $a$, an air-pipe to be connected with an air-pump for the admission of atmospheric air into the chamber M, along down the inside of the gasometer and near the circumference of the vessel, as shown in Fig. 2. The pipe $b$, on the opposite of the vessel is for the passage of the illuminating-gas to the burner. $c$ is an opening for supplying the reservoir O with gasoline. This reservoir occupies the upper portion of the gasometer, and has an opening in the center of its bottom, through which the gasoline passes into chamber M′ immediately below. A stand-pipe, E, runs through, vertically, the center of the reservoir O, from its bottom to its top, and this pipe is perforated at $e$ to allow the gasoline in the reservoir to pass down into the chamber M′. Through the stand-pipe E passes a rod, J, which extends from the top of the gasometer to the bottom of the lower chamber, M, as shown in Fig. 2. Attached to this rod, at a point just below the bottom of the reservoir, is a conical-shaped valve, F, for closing the opening in the bottom of the reservoir, through which the gasoline passes down. At the bottom of the rod is the float $j$, rigidly attached, so that when the gasoline which has passed down reaches a determined height in chamber M it raises the float $j$, and with it the rod J and the valve F, until the valve reaches the opening in the bottom of the reservoir and closes it, and stops any further flow of the gasoline downward until the supply in the chamber M is diminished, and the float $j$ is allowed to descend. This would necessarily reopen the valve F and allow the gasoline again to flow through. In the center of the chamber M′, and directly under the opening at $e$, I place a convex distributer, as shown in Fig. 2. This distributer arrests the gasoline in its downward flow, and spreads it in the chamber M′. From the top of the chamber M′ I suspend evaporators, made of any suitable material, for soaking up the gasoline. These evaporators $m$ extend down into the gasoline held in the chamber M′, and by the well-known laws of capillary attraction take up the gasoline and allow it to evaporate from their surfaces. Around the opening in the center of the bottom of the chamber M′ I secure a short tube, K, of a height equal to the height I wish the gasoline to be held in the chamber. Hence, when the gasoline has reached this height it will overflow into the tube K, and pass downward into the chamber M below. At this point the gasoline is caught in a spiral or winding trough, $t$, as shown in Fig. 3, and follows the trough $t$ from the center to the circumference of the chamber. This trough is secured in any convenient manner to the top of chamber M. From this winding trough I again suspend evaporators winding with the trough, into which one edge of the evaporator is placed while it thus hangs down, as shown in Fig. 2, into the gasoline in the chamber.

The operation of my machine is as follows: The reservoir O having been filled the valve F is opened and the gasoline passes into chamber M′ until it rises as high or above the top of the short tube K, when it overflows, and running down the tube passes into the winding trough $t$, where the evaporators become filled, and from which it flows into the bottom of the chamber M. When a sufficient quantity has passed in, the float $j$ rises and the valve F closes. The supply is thus automatically regulated. At the same time the supply of atmospheric air passes from the top to the bottom of the gasometer, and from the circumference to the center, passing up through the short tube K, and again passing from the center to the circumference, and, becoming fully charged with the vaporized gasoline, passes out through the pipe b to the burner.

It will be seen from the foregoing description that I use my gasoline from the bottom of the reservoir, and thus avoid a common difficulty met with by those who evaporate from the upper surface. In the latter case, after evaporation has been going on for a brief period, there begins to accumulate on the top of the gasoline a sediment or film, which retards evaporation and interferes injuriously with the operation of the machine. It is also a well-known fact that those who evaporate from the upper surface are frequently compelled to pump out the residuum, which accumulates and which cannot be evaporated.

Having thus described my invention, what I claim as new, and desire to secure by Letters Patent, is—

A gas-machine, constructed as described, in which the gasoline is used from the bottom of the reservoir, and consisting of the reservoir O and chambers M M', provided with the evaporators m and winding trough t, in combination with the rod J, valve K, float j, tube K, stand-pipe E, and pipes a b, all constructed and arranged substantially as and for the purpose set forth.

JAMES M. DILLON.

Witnesses:
W. D. MOTTE,
WILLIAM DILLON.